June 23, 1942. A. RAYNES 2,287,640
SHIFTABLE FILM-HOLDER FOR CAMERAS
Filed Nov. 2, 1940
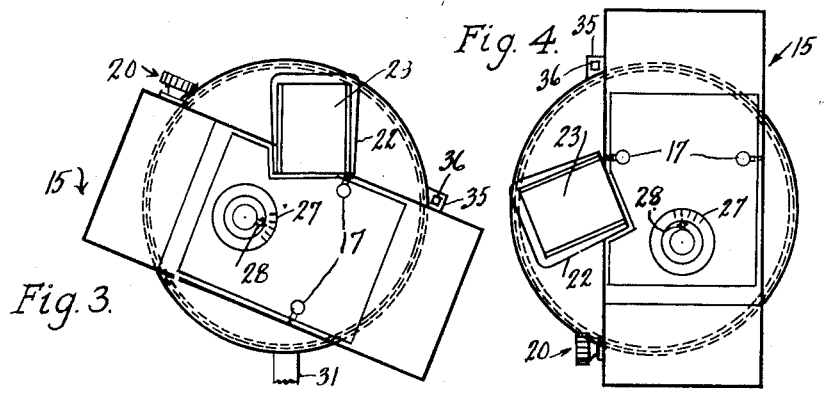
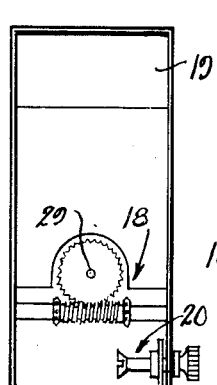
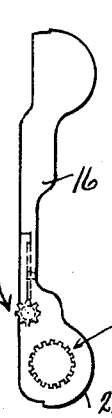
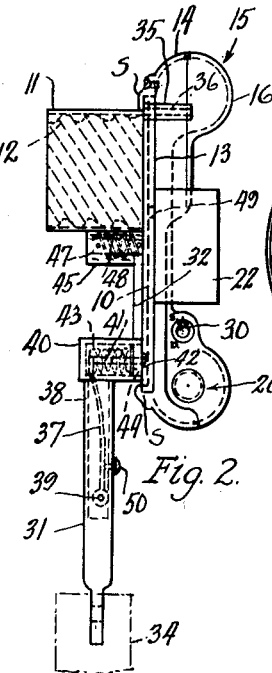
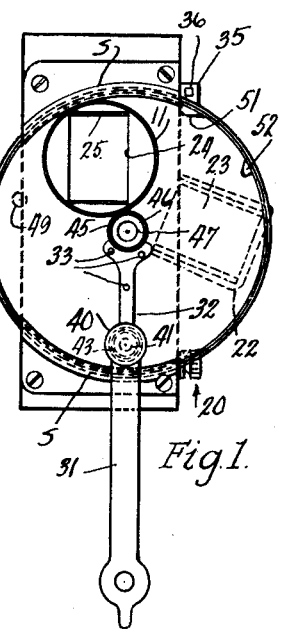
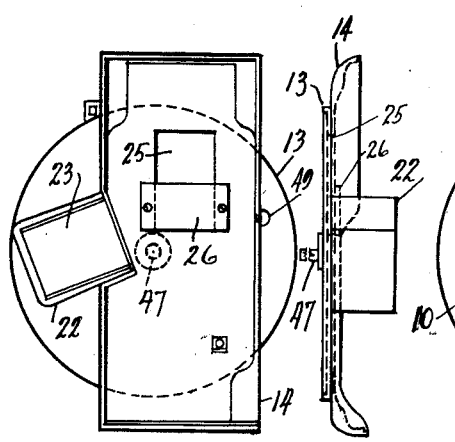
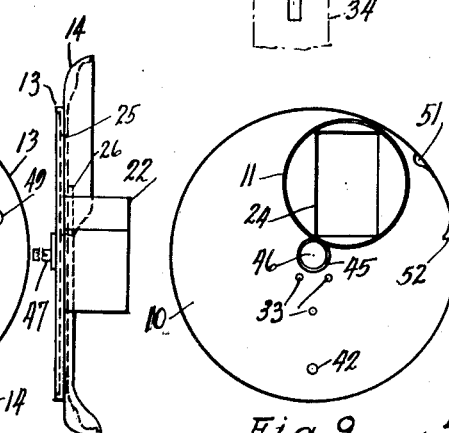
Inventor:
Alexander Raynes.
per
Attorney Patented June 23, 1942

2,287,640

UNITED STATES PATENT OFFICE 2,287,640

SHIFTABLE FILM-HOLDER FOR CAMERAS

Alexander Raynes, New York, N. Y.

Application November 2, 1940, Serial No. 364,017

5 Claims. (Cl. 95—49)

This invention relates to photographic cameras and more particularly to cameras wherein the film holder is adapted to be shifted out of alinement with the lens during the focusing operation so as to avoid the danger of untimely or accidental exposure of the film.

One object of the invention is the provision of simple means whereby the film holder may be moved or shifted out of the path of the opening leading to the lens in the camera during focusing.

Another object of the invention is to provide means whereby the film holder may be automatically brought into position after the focusing operation is completed.

A further object of the invention is to provide means for determining whether the camera lens is in proper frame after focusing, especially when the camera is manually held.

A still further object of the invention is to provide stop means whereby the film chamber or holder may be brought into proper position for both focusing and photographing purposes.

Yet another object of the invention is the provision of spring means for automatically returning the film holder to photographing position after it has been shifted out of such position for focusing purposes.

A still further object of the invention is the provision of means for adapting the device for both single or double frame exposures.

Another object is to produce a device of character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which Figure 1 is a front view of my improved camera with the lens and shutter mechanism omitted;

Figure 2 is a side view looking from the right of Figure 1;

Figure 3 is a rear view showing the device in focusing position;

Figure 4 is a rear view thereof in photographing position;

Figure 5 is a front view showing the interior of the film holder;

Figure 6 is a side view thereof;

Figure 7 is a rear view of the film holder supporting disk;

Figure 8 is a side view thereof;

Figure 9 is a front view of the lens supporting disk and

Figure 10 is a side view thereof looking from the left of Figure 9.

Referring now to the drawing in detail 10 indicates the front plate or disk which is provided with a tubular sleeve 11 provided at the interior thereof with threads 12 for the reception of the lens and shutter mechanism (not shown) the said mechanism being provided with a tubular outwardly threaded sleeve for engagement with the inner threads 12 whereby the lens is moved into proper focusing position.

Rotatably mounted on the disk 10 is a second plate or disk 13 which is provided with peripheral slideways S for centrally locating and maintaining the plates or disks 10 and 13 with respect to each other, the said plate 13 carries the lower portion 14 of a casing 15 the upper portion 16 thereof being secured by screws 17 to the lower portion 14 to form a separable film holder which at the interior thereof is provided with the usual film feeding means 18. As is the custom in such devices one of the film spools may be located in a chamber 19 at one end of the spool carrier and the other spool may be mounted on a spool winding mechanism 20 in a chamber 21 at the opposite end of the said spool carrier. The plate 13 is provided with a housing 22 which shields a ground glass 23 which may be brought into alinement with an opening 24 in the plate 10. Said opening 24 provides a direct communication between the lens and ground glass when the device is in focusing position, and also permits the object being photographed to be projected upon the film, when the film holder is in photographing position with the opening 25 in the plate 13 in alinement with the said opening 24. The normal length of the opening 25 is large enough to permit of photographing a double frame picture, by securing a plate 26 over the said opening provision is made for photographing single frame pictures. By a single frame picture is meant a picture of a length equivalent to a given standard of film and by double frame is meant a length twice the standard length.

In order to determine the number of exposures taken, there is provided a graduated scale 27 (see Figs. 3 and 4), and an indicator 28 which is operated from the worm wheel shaft 29 of the film feeding device 18. In order to determine whether the camera is set for single or dougle frame work, I have provided an indicator 30 (see Fig. 2) which may be manually set.

To support the device there is provided a post 31 having an arm 32 secured at its upper end as at 33 to the stationary plate 10, the post itself being adapted to be inserted into a stand or support 34 and be removably supported therein.

The focusing and photographing operations may be performed either when the camera is supported in the stand 34 or the said operations may be performed when it is held in the hand. When the latter is the case the device is sometimes shifted either horizontally or vertically out of alinement or frame with the object to be photographer. In order to obviate this undesirable feature, I provide a gage 35 (see Figs. 1 to 4) having a sight opening 36 through which, when the device is in proper photographing position, the object to be photographed may be viewed. Thus when the camera and object are out of proper alinement the said gage aids in properly alining same.

If desirable means may be provided for automatically returning the film holder into photographing position when the focusing operation is completed. To accomplish the aforementioned object there is provided an arm 37 which is housed in the hollowed out portion 38 of the post 31 and which is pivoted at its lower end at 39 best shown in Fig. 2 of the drawing. The said arm extends at its upper end into a hollow boss 40 forming a part of the said post 31. A pin 41 projects from the said upper end of the arm 37 and extends into a hole 42 in the plate 10. A spring 43 exerting a tension against a disk 44 on the pin 41 maintains the said pin under tension against the surface of the plate 13. The plate or disk 10 is provided with a central hub 45 having a bore 46 into which extends a short shaft or pin 47 projecting from the plate 13. A spring 48 (see Fig. 2) coils about the said pin 47 and has one of its ends anchored in the said pin and the opposite end in the hub 45.

To bring the ground glass 23 into alinement with the opening 24 which leads into the lens chamber, so that the object to be photographed may be properly focused, the film holder is manually moved into the position shown in Fig. 3. When in this position the pin 41 is forced into an opening or hole 49 in the disk 13 thus maintaining the said film holder in the above position. After the focusing operation is performed a button 50 at the lower end of the arm 37 is pressed inwardly to disengage the pin 41 from the hole 49, thus permitting the spring 48 which has become tensioned during the rotation of the film holder 15, to return the said holder into the normal photographing position shown in Fig. 1 against a stop 51. Where no automatic return is provided a stop 52 is provided for limiting the movement of the frame holder into focusing position.

From the foregoing it will be seen that I have provided a simple inexpensive camera for taking single or double frame pictures, said camera having a film holder which may be moved into one position while focusing the object to be photographed and to another position when the object is in focus and ready to be photographed, the said film holder being provided with a ground glass adapted to be brought into alinement with the photographic lens to receive an image of the article to be photographed.

It will also be seen that the said film holder may be automatically returned to normal photographing position by merely pressing a button. Likewise it will be seen that I have provided means for properly framing the object to be photographed if for any reason such framing is destroyed when the camera is held in the hand of the photographer while shifting the film holder.

Having described my invention what I claim as new and desire to secure by Letters Patent is:

1. In a photographic camera, a plate having an opening therein, a lens receiving tube on the plate in registry with the said opening, a holder for receiving photographic film rotatably mounted on the said plate, the said plate having a film exposing opening, a ground glass carried by the said film holder, the film exposing opening and ground glass being spaced apart so that when one of them is brought into registry with the opening in the plate by the rotation of the film holder the other will be out of registry with the said opening, means for automatically returning the film holder from the position where the ground glass is in registry with the opening in the plate to the position where the film exposing opening in the film holder is in registry with the said opening, the said means comprising a bored hub on the plate, the said plate having a pin receiving hole, a shaft on the film holder extending into the said hub, a coiled spring about the said shaft adapted to be tensioned when the film holder is rotated to bring the ground glass into registry with the opening in the plate, a post, an arm pivotally mounted at one end on the post, a pin carried by the arm at the opposite end, a spring for pressing the said pin into the pin receiving hole, the film holder having a pin receiving hole in angularly spaced relation to the pin receiving hole in the plate and adapted to receive the pin when the film holder is rotated to bring the ground glass into registry with the plate opening, and means whereby the arm may be pressed to bring the pin out of the hole in the film holder to permit the spring in the hub to rotate the holder to bring the film exposing hole therein into registry with the opening in the plate.

2. In a photographic camera, a plate having an opening therein, a lens receiving tube on the plate in registry with the said opening, a holder for receiving photographic film rotatably mounted on the said plate, the said plate having a film exposing opening, a ground glass carried by the said film holder, the film exposing opening and ground glass being spaced apart so that when one of them is brought into registry with the opening in the plate by the rotation of the film holder the other will be out of registry with the said opening, means for automatically returning the film holder from the position where the ground glass is in registry with the opening in the plate to the position where the film exposing opening in the film holder is in registry with the said opening, the said means comprising a bored hub on the plate, the said plate having a pin receiving hole, a shaft on the film holder extending into the said hub, a coiled spring about the said shaft adapted to be tensioned when the film holder is rotated to bring the ground glass into registry with the opening in the plate, a post secured to said plate, an arm pivotally mounted at one end on the post, a pin carried by the arm at the opposite end, a spring for pressing the said pin into the pin receiving hole, the film holder having a pin receiving hole in angularly spaced relation to the pin receiving hole in the plate and adapted to receive the pin when the film holder is rotated to bring the ground glass into registry with the plate opening, means whereby the arm may be pressed to bring the pin out of the hole in the film holder to permit the spring in the hub to rotate the holder to bring the film exposing hole therein into registry with the opening in the plate, and means to stop the movement of the said holder in said last named position.

3. In a photographic camera, a plate having an opening in alinement with the camera lens, a photographic film holder having an opening therein for exposing the photographic film, a ground glass for receiving the focused image of an object to be photographed, carried by the said film holder, the said film holder being shiftably mounted on the said plate so that either the film exposing opening or the ground glass may be brought into registry with the lens opening in the plate, means for automatically bringing the ground glass out of registry with the lens opening in the plate and the film exposing opening in the holder in registry therewith, the said means comprising a bored hub on the plate, the said plate having a pin receiving hole, a shaft on the film holder extending into the said hub, a coiled spring about the said shaft the said spring being tensioned when the film holder is rotated to bring the ground glass into registry with the opening in the plate, a post, an arm pivotally mounted at one end on the post, a pin carried by the arm at the opposite end, a spring for pressing the said pin into the pin receiving hole, the film holder having a pin receiving hole in angularly spaced relation to the pin receiving hole in the plate and adapted to receive the pin when the film holder is rotated to bring the ground glass into registry with the plate opening, and means whereby the arm may be pressed to bring the pin out of the hole in the film holder to permit the spring in the hub to rotate the holder to bring the film exposing hole therein into registry with the opening in the plate.

4. In a photographic camera, a plate having an opening therein, a lens receiving tube on said plate in registry with said opening, a holder for photographic film rotatably mounted on said plate, said holder comprising a disc provided with peripheral slideways and an elongated casing adapted to receive a roll of photographic film, said peripheral slideways engaging the outer periphery of said plate for centrally locating and maintaining said disc and plate in superimposed relation to one another, a ground glass carried by said disc, a film exposing opening in said disc, said film exposing opening and ground glass being spaced apart and capable of being brought in alignment with said opening in said plate, a hollow hub on said plate, a pin receiving hole in said plate, a shaft on said disc extending into said hub, a spring coiled about said shaft, one end of said spring being secured to said shaft and the other end thereof secured to said hub whereby the rotation of said film holder for aligning the ground glass with the opening in the plate will tension said spring, and means for maintaining said ground glass in alignment with said opening, said means comprising a post, an arm pivotally mounted at one end of the post, a pin carried by the arm at the opposite end thereof, a spring for pressing the said pin into the pin-receiving hole, the film holder having a pin-receiving hole in angularly spaced relation to the pin-receiving hole in the plate and adapted to receive the pin when the film holder is rotated to bring the ground glass into registry with the plate opening, and means whereby the arm may be pressed to bring the pin out of the hole in the film holder to permit the spring in the hub to rotate the holder to bring the film exposing opening therein into registry with the opening in the plate.

5. In a photographic camera, a plate having an opening therein, a lens receiving tube on said plate in registry with said opening, a holder for photographic film rotatably mounted on said plate, said holder comprising a disc provided with peripheral slideways and an elongated casing adapted to receive a roll of photographic film, said peripheral slideways engaging the outer periphery of said plate for centrally locating and maintaining said disc and plate in superimposed relation to one another, a ground glass carried by said disc, a film exposing opening in said disc, said film exposing opening and ground glass being spaced apart and capable of being brought in alignment with said opening in said plate, a hollow hub on said plate, a pin receiving hole in said plate, a shaft on said disc extending into said hub, a spring coiled about said shaft, one end of said spring being secured to said shaft and the other end thereof secured to said hub whereby the rotation of said film holder for aligning the ground glass with the opening in the plate will tension said spring, and means for maintaining said ground glass in alignment with said opening, said means comprising a post, said post provided with a hollow portion extending substantially the length thereof and a hollow boss at the open end of said post, an army pivotally mounted within said post, a pin carried by the said arm at the opposite end thereof, a spring within said boss, said arm cooperating with said spring for maintaining said pin into and out of engagement with the pin-receiving hole in said plate, the film holder having a pin-receiving hole in angularly spaced relation to the pin-receiving hole in the plate and adapted to receive the pin when the film holder is rotated to bring the ground glass into registry with the opening, and means whereby the arm may be pressed to bring the pin out of engagement with the hole in the film holder to permit the spring in the hub to rotate the holder and bring the film-exposing opening therein into registry with the opening in the plate.

ALEXANDER RAYNES.